United States Patent [19]
Ohhashi et al.

[11] Patent Number: 5,245,825
[45] Date of Patent: Sep. 21, 1993

[54] HONEYCOMB MONOLITH HEATER

[75] Inventors: Tsuneaki Ohhashi, Ohgaki; Nobuo Tsuno, Kasugai; Tomoharu Kondo, Toko, all of Japan

[73] Assignee: NGK Insulators, Ltd., Japan

[21] Appl. No.: 844,224

[22] Filed: Mar. 2, 1992

[30] Foreign Application Priority Data

Mar. 6, 1991 [JP] Japan ................ 3-065419

[51] Int. Cl.$^5$ .............................. F01N 3/28
[52] U.S. Cl. ........................ 60/300; 422/174
[58] Field of Search ............ 60/300; 422/174; 55/466, 523, DIG. 30

[56] References Cited

U.S. PATENT DOCUMENTS

| 4,505,107 | 3/1985 | Yamaguchi ............ 60/303 |
| 5,063,029 | 11/1991 | Mizuno et al. |

FOREIGN PATENT DOCUMENTS

| 58-23138 | 5/1983 | Japan . |
| 106115 | 6/1983 | Japan ............ 422/174 |
| 206818 | 12/1983 | Japan ............ 60/300 |
| 63-67609 | 5/1988 | Japan . |
| 1492929 | 11/1977 | United Kingdom . |
| 89/10471 | 11/1989 | World Int. Prop. O. . |

OTHER PUBLICATIONS

Soviet Inventions Illustrated, Section EI, Week 8717, 10 Jun. 1987, Derwent Publications Ltd., London, GB; Class X, p. 6, AN 87-120908/17 & SU-A-1 254 596 (Electrotherm Equip.) 30 Aug. 1986–abstract.

Primary Examiner—Douglas Hart
Attorney, Agent, or Firm—Parkhurst, Wendel & Rossi

[57] ABSTRACT

A honeycomb monolith heater including a honeycomb structure having a plurality of passages of square or rectangular cross-sectional shape and a plurality of electrode plates fixed to the outer wall of the honeycomb structure, in which the electrode plates are arranged so that the angle formed by the electrode plates and the passage walls is an acute angle. A honeycomb monolith heater assures uniform heat generation and which has improved mechanical properties.

9 Claims, 4 Drawing Sheets

HONEYCOMB MONOLITH HEATER

BACKGROUND OF THE INVENTION

1. Field of the Invention

The present invention relates to a honeycomb monolith heater comprising a honeycomb structure having a plurality of electrode plates fixed to an outer wall of the honeycomb structure.

Honeycomb heaters of the above-described type can be employed as heaters for domestic use, such as a hot-air heater, or as industrial heaters, such as preheaters used for control of automobile exhaust emissions.

2. Description of the Prior Art

These days, besides porous ceramic honeycomb structures conventionally employed, metal honeycomb structures are drawing attention as catalysts or catalyst carriers for removing nitrogen oxide, carbon monoxide and hydrocarbons present in the exhaust gas from internal combustion engines, such as from automobiles.

As restriction of exhaust emission has been intensified, there has been a demand for development of heaters for use in reducing automobile exhaust emission when the temperature of the catalyst is not sufficiently high, i.e., at the beginning of running of a vehicle.

Honeycomb structures have been proposed in, for example, U.K. Patent 1492929 and Japanese Utility Model Laid-Open No. 67609/1988.

U.K. Patent 1492929 discloses a foil-type metal honeycomb structure in a catalyst for use in automobile exhaust emission control. This honeycomb structure comprises a metal substrate produced by winding, together with a flat plate, a mechanically deformed, corrugated flat plate. This metal substrate has an aluminum oxide film formed on the surface thereof by an oxidation process. The catalyst for use in automobile exhaust emission control is manufactured by placing a large surface area oxide, such as alumina, on the aluminum oxide film of the metal substrate and by impregnating a noble metal on the large surface area oxide.

Japanese Utility Model Laid-Open No. 67609/1988 discloses an electrically conductable metal monolith catalyst for use as a preheater comprising a metal support and alumina coated thereon.

In the foil-type metal honeycomb structure disclosed in U.K. Patent 1492929, however, telescope phenomenon readily occurs during the run cycle in which metal-to-metal joins break and the metal substrate is deformed in such a manner that it protrudes in the direction of the flow of gas. This may disturb safe running of the vehicle. Furthermore, in the manufacture of the foil-type metal honeycomb, yield of the rolling process is low, inviting high production cost. In the preheater proposed in Japanese Utility Model Laid-Open No. 67609/1988, a catalyst readily peels off due to a difference in thermal expansion between alumina and the metal support. Furthermore, metal-to-metal joins of the metal substrate break during operation, generating an electrically insulating portion and, hence, non-uniform flow of current and non-uniform heating.

Furthermore, in the preheater disclosed in Japanese Utility Model Laid-Open No. 67609/1988, since the electrodes are provided on the inner peripheral portion of the preheater, the central portion thereof does not act as a catalyst and pressure loss may be generated. Furthermore, the electrodes readily breaks due to the flow of gas.

SUMMARY OF THE INVENTION

Accordingly, an object of the present invention is to provide a honeycomb monolith heater which eliminates the aforementioned problems of the prior techniques.

The present invention provides a honeycomb monolith heater comprising a honeycomb structure having a large number of passages of square or rectangular cross-sectional shape and a plurality of electrode plates fixed to the outer wall of the honeycomb structure, said electrode plates being arranged so that the angle formed by the electrode plates and the passage walls is an acute angle.

Preferably in the present invention, the angle formed by the electrode plates and the passage walls is 45° to 60°. Also preferably, at least one electrical insulating area is formed in each outer wall portion of the honeycomb structure between the electrode plates to obtain improved heat generation.

DETAILED DESCRIPTION OF THE INVENTION

The present invention resides in a honeycomb monolith heater comprising a honeycomb structure having a large number of passages of square or rectangular cross-sectional shape and a plurality of electrode plates fixed to the outer wall of the honeycomb structure, in which the electrode plates are arranged so that the angle formed by the electrode plates and the passage walls is an acute angle. The present honeycomb monolith heater assures uniform heat generation and has improved mechanical properties.

In the present invention, the angle formed by the electrode plates and the passage walls is defined as follows.

Figure 1:
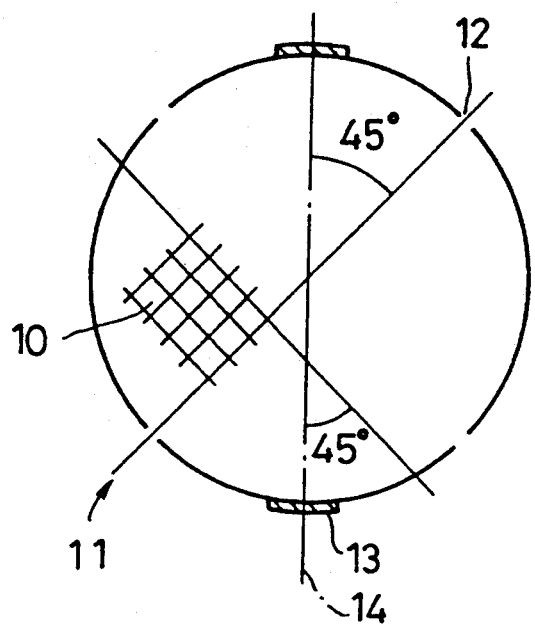
FIG. 1 is a sectional view showing an example (heater catalyst A) of the honeycomb monolith heater of the present invention.
Figure 2:
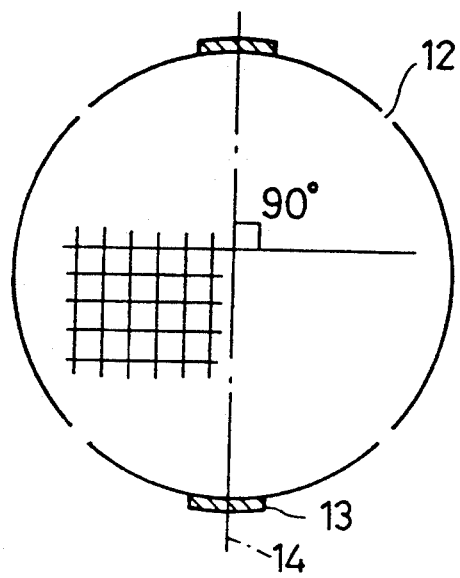
FIG. 2 is a sectional view showing an example (heater catalyst B) of the honeycomb monolith heater of the present invention.

As one parameter for defining the relative positions of the passage walls of the honeycomb structure and the electrode plates attached to the outer wall of the honeycomb structure, there is an angle of 0° to 90° formed by (a) a line connecting the centers of one pair of the electrode plates facing each other and (b) an extension line of each passage wall. In the case of the honeycomb structure having square or rectangular cells, there are two such angles as shown in FIGS. 1 and 2, i.e. 45° and 45° in FIG. 1 and 0° and 90° in FIG. 2. In the present invention, of these angles, the larger angle (i.e. an angle of 45° to 90°) it taken as the angle formed by the electrode plates and the passage walls. Accordingly, the angle is 45° in FIG. 1 and 90° in FIG. 2.

The above honeycomb structure is preferably prepared by molding raw material powders into a honeycomb shape and sintering the shape. In this case, the use of extrusion for molding is preferable because it provides advantages of simple production steps and low cost. When the honeycomb structure and the electrode plates are simultaneously extruded, dried and fired to obtain a honeycomb monolith heater, the production steps are simple and fewer and the honeycomb monolith heater has improved mechanical properties because of the one-piece structure.

Previously, in U.S. Pat. No. 5,063,029 (commonly owned), a honeycomb heater was disclosed comprising (a) a honeycomb structure having a large number of passages, (b) at least two electrodes provided thereon for electrical heating thereof and (c) slits as a resistance adjusting means, provided between the electrodes. In this honeycomb heater, however, since the slits are formed long and deep into the honeycomb structure, problems exist in that the step for slit formation is complex and time-consuming and the honeycomb structure has relatively low mechanical strength.

These problems have been solved by the present invention by arranging the electrode plates so that the angle formed by the electrode plates and the passage walls is an acute angle.

The honeycomb monolith heater of the present invention is explained with reference to the accompanying drawings.

FIG. 1 is a sectional view showing an example of the honeycomb monolith heater of the present invention. In this heater, the honeycomb structure 11 is columnar in external shape and has square cells (passages) 10 of square cross-sectional shape; four slits 12 are formed on the outer wall of the honeycomb structure 11; and two electrode plates 13 and two terminals 14 are fixed to the outer wall of the honeycomb structure 11. FIG. 2 is a sectional view showing an example of the honeycomb monolith heater of the present invention wherein the relative positions of the electrode plates 13 and the square cells 10 are different from those in FIG. 1.

Figure 3:
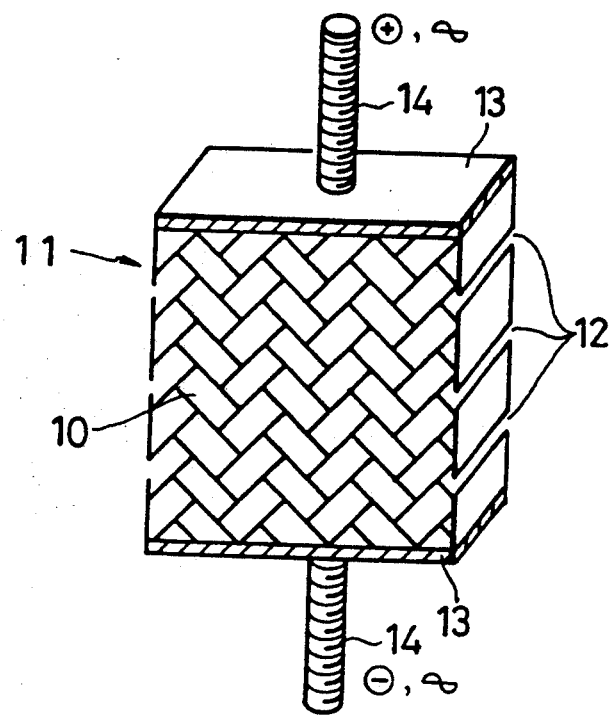
FIG. 3 is a perspective view showing an example of the honeycomb monolith heater of the present invention.
Figure 4:
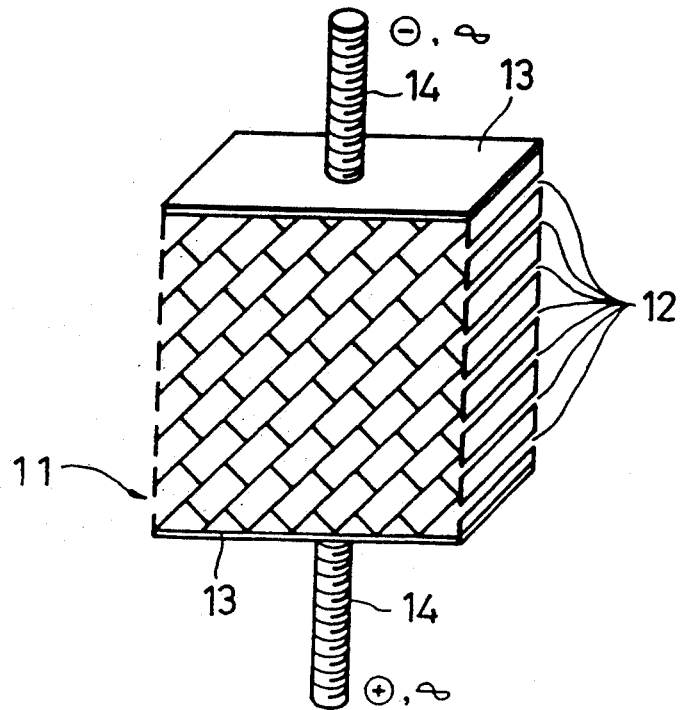
FIG. 4 is a perspective view showing an example of the honeycomb monolith heater of the present invention.

FIGS. 3 and 4 are each a perspective view showing another example of the honeycomb monolith heater of the present invention wherein the honeycomb structure 11 is a rectangular parallelepiped in external shape and has having rectangular cells 10 rectangular cross-section shape. In these heaters, as shown in FIGS. 3 and 4, electrode plates 13 are formed as outer walls which are thicker than the ordinary passage cell walls. Electrode plates 13 are formed on the entire surfaces of the upper and lower ends of the honeycomb structure 11.

Figure 5:
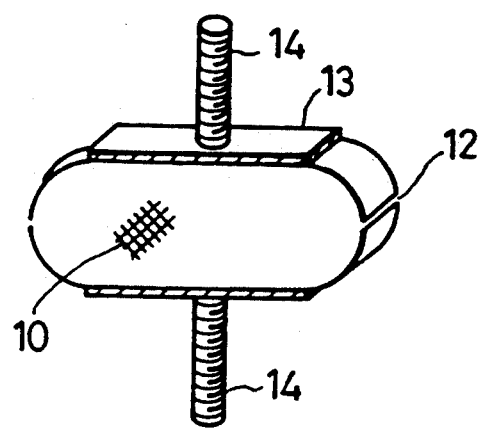
FIG. 5 is a perspective view showing an example of the honeycomb monolith heater of the present invention.

FIG. 5 shows yet another example of the honeycomb monolith heater of the present invention. In this heater, the honeycomb structure 11 is a race track in external shape and has square cells 10 having square cross-sections; and two plates made of a highly conductive material are welded to the upper and lower ends of the honeycomb structure 11 to use as electrodes 13.

Figure 6:
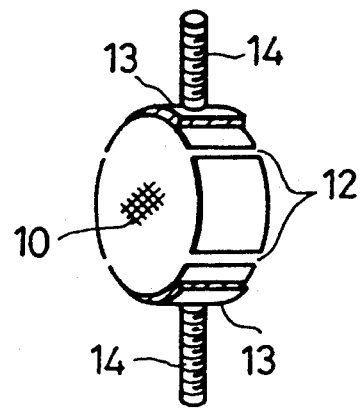
FIG. 6 is a perspective view showing an example of the honeycomb monolith heater of the present invention.
Figure 7:
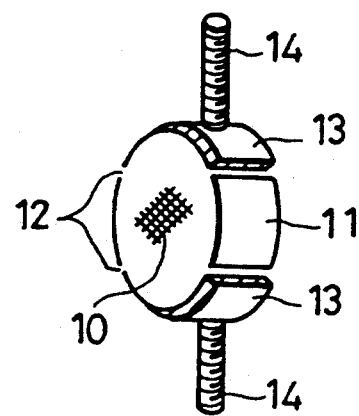
FIG. 7 is a perspective view showing an example of the honeycomb monolith heater of the present invention.

FIGS. 6 and 7 each show yet another example of the honeycomb monolith heater of the present invention. In these heaters, the honeycomb structure 11 is columnar in external shape and has rectangular cells 10 having rectangular cross-sections; and two plates having the same curvature as the outer wall of the honeycomb structure 11 are welded to the outer wall of the honeycomb structure 11 to use as electrodes 13.

Preferably, in the honeycomb monolith heater of the present invention, at least one slit is formed as an electrical insulating area in the outer wall of the honeycomb structure in order to increase the heat generation of the honeycomb structure, i.e. the heater portion of the honeycomb monolith heater.

The passages (cells) of the honeycomb structure have a square or rectangular cross-sectional shape. Preferably, the ratio of the long side length and the short side length is in the range of 1 to 5.

Further, preferably, the honeycomb structure is prepared so that the ratio of the thickness ($d_o$) of the outer wall of the honeycomb structure and the thickness ($d_c$) of the passage walls (cell walls) satisfies $d_o/d_c \leq 10$, in view of the balance of the heat generation and mechanical properties of the honeycomb monolith heater.

In the honeycomb monolith heater of the present invention, the passage walls and pores of the metallic honeycomb structure are preferably coated with a heat-resistant metal oxide such as $Al_2O_3$, $Cr_2O_3$ or the like for improved heat resistance, oxidation resistance and corrosion resistance.

Whereas any material, ceramic or metal, capable of generating heat when energized can be used as the material of the honeycomb structure which is the basic body of the present invention, the use of metals enhances the mechanical strength. Examples of such metals include stainless steel and those having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of their low cost and and high resistance to heat, oxidation and corrosion. Foil-type metal honeycomb structures may also be employed.

The honeycomb structure employed in the present invention may be porous or may not be porous. In the case where a catalyst is carried on the honeycomb structure, however, a porous honeycomb structure is preferred because it is closely adhered to a catalyst layer and does not cause peeling due to a difference in the thermal expansion between the honeycomb structure and the catalyst. Even if a non-porous honeycomb structure is employed, since the heater of this invention has a resistance-adjusting means which may be a slit, thermal stress can be reduced and the possibility of crack occurrence can be decreased.

The method of manufacturing the metal honeycomb structure which can be employed in the present invention will now be exemplified.

First, Fe powder, Al powder and Cr powder, or alternatively powder of alloys of these metals, are mixed to prepare a metal powder material having a desired composition. Subsequently, the metal powder material is blended with an organic binder, such as methyl cellulose or polyvinylalcohol, and water to produce a readily formable mixture, and that mixture is then formed into a shape of a desired honeycomb configuration by the extrusion.

When the metal powder material is blended with an organic binder and water, prior to the addition of water, an antioxidant, such as oleic acid, may be added to the metal powder material. Alternatively, metal powder which has been subjected to anti-oxidation process may be employed.

Next, the shaped honeycomb body is fired in a non-oxidizing atmosphere at a temperature between 1000° and 1400° C. During the firing in the non-oxidizing atmosphere containing hydrogen, the organic binder is decomposed and thereby removed with the aid of Fe or the like which acts as a catalyst, and a good sintered body can therefore be obtained.

Sintering at a temperature lower than 1000° C. achieves no sintering. Sintering conducted at a temperature higher than 1400° C. causes deformation of the resulting sintered body.

Preferably, a heat-resistant metal oxide is then coated on the surface of the partition walls and that of the pores of the obtained sintered body by any of the following methods:

(1) the metal honeycomb structure (the sintered body) is subjected to heat-treatment in an oxidizing atmosphere at a temperature between 700° to 1200° C.;

(2) Al or the like is plated (e.g., vapor plating) on the surface of the partition walls and that of the pores of the sintered body and that sintered body is then subjected to heat-treatment in an oxidizing atmosphere at a temperature between 700° and 1200° C.;

(3) the sintered body is dipped into a molten metal, such as Al, and is then subjected to the heat-treatment in an oxidizing atmosphere at a temperature between 700° and 1200° C.; or (4) alumina sol or the like is coated on the surface of the partition walls and that of the pores of the sintered body and that sintered body is then subjected to heat-treatment in an oxidizing atmosphere at a temperature between 700° and 1200° C.

To enhance resistance to heat and oxidation, heat-treatment conducted at a temperature between 900° and 1150° C. is preferred.

A plurality of electrode plates are arranged on the outer wall of the thus obtained metallic honeycomb structure by a means such as one-piece extrusion, brazing, welding or the like so that the angle formed by the electrode plates and the passage walls of the honeycomb structure is an acute angle, whereby a honeycomb monolith heater of the present invention is prepared.

The area of each electrode plate has no particular restriction. However, too small an electrode area causes excessive heat generation in the vicinity of each electrode; too large an electrode area invites decrease in effective area of heat generation; in any of these cases, the heating efficiency for gas to be treated is reduced. The area of electrode plate is appropriately determined depending upon the shapes and sizes of cells and honeycomb structure. For example, when the honeycomb structure is prismatic or race-track-shaped and has two parallel outer walls, it is preferable to arrange electrode plates on the entire surfaces of the two parallel walls; or when the honeycomb structure is oval or columnar, it is preferable to arrange each electrode plate so that the area of the plate makes an angle of 5° to 150°.

Incidentally, the angle made by the electrode plate is 20° in FIGS. 1 and 2, 70° in FIGS. 3 and 4, 130° in FIG. 5, 45° in FIG. 6 and 90° in FIG. 7.

Regarding the formation of slits on the outer wall of the honeycomb structure, it is preferable to obtain a honeycomb structure having slits parallel to passages, by one-piece extrusion in view of the fewer production steps. However, slits may also be formed after molding, drying or firing. In this case, slits need not be formed in parallel to the passages and may be oblique thereto or curved as long as the slits ensure substantial electrical insulation.

The honeycomb monolith heater is preferably prepared so as to have an electric resistance of 0.001-0.5Ω as a whole.

The honeycomb monolith heater of the present invention may have a constitution in which a plurality of the heaters having the above properties are connected so as to make a series circuit.

Preferably, a catalyst is loaded on the surface of the metallic honeycomb structure because a larger temperature increase by the purification reaction (e.g. oxidation reaction) of exhaust gas can be expected.

The catalyst loaded on the surface of the metallic honeycomb structure is a catalytically active substance supported on a carrier of large surface area. Typical examples of carrier materials having large surface area are $Al_2O_3$, $TiO_2$ type, $SiO_2$-$Al_2O_3$ and perovskite. Catalytically active materials include, for example, noble metals such as Pt, Pd, Rh and the like, and base metals such as Cu, Ni, Cr, Co and the like. Of these, Pt, Pd or Rh supported on $\gamma$-$Al_2O_3$ type in an amount of 10-100 g/ft$^3$ is preferable.

When the honeycomb monolith heater of the present invention is used for purification of automobile exhaust gas, the primary electric source is, for example, a battery or an alternator, and it is preferable to use an electric current which is electrically controlled.

In the present invention, the honeycomb structure has no particular restriction as to the honeycomb shape, but it is preferably prepared so as to have a cell density of, for example, 6-1,500 cells/in$^2$ (0.9-233 cells/cm$^2$).

Further, the thickness of the passage walls is preferably 50-2,000 μm.

The honeycomb structure may be porous or non-porous and has no restriction as to the porosity. However, the porosity is desirably 0-50%, preferably less than 25% in view of the strength, oxidation resistance and corrosion resistance. When the honeycomb structure has a catalyst supported thereon, it preferably has a porosity of 5% or more in view of the adhesion to the catalyst layer.

In the present invention, the honeycomb structure refers to an integral structure having a large number of passages divided by passage walls, and its shape can be any, for example, columnar, rectangular, oval or the like.

The present invention is hereinafter described in more detail referring to Examples. However, the present invention is by no means restricted to these Examples.

EXAMPLE 1

Preparation of sample A

A Fe powder, a Fe-Cr powder and a Fe-Al powder were compounded so as to give a composition of Fe-20Cr-5Al (% by weight). Thereto were added an organic binder (methyl cellulose), an antioxidant (oleic acid) and water to prepare a body. The body was extruded. The extrudate was dried to prepare a dried honeycomb material of 110 mm in outside diameter and 6 mm in thickness, having square cells 10 of 4 mil in rib thickness and 300 cells/in$^2$ in cell density as shown in FIG. 1. Incidentally, the thickness of the outer wall of the dried honeycomb material was 5 mil. Four slits 12 were formed in the outer wall.

The dried honeycomb material was fired in a H₂ atmosphere to obtain a honeycomb structure 11 of 92 mm in outside diameter and 5 mm in thickness.

$\gamma$-$Al_2O_3$ was coated on the honeycomb structure 11. Then, noble metals, Pt and Pd were coated thereon in amounts of 30 g/ft³ and 6 g/ft³, respectively. The resulting material was fired at 600° C. to obtain a honeycomb structure 11 having a catalyst supported thereon. Thereafter, two electrodes 13 and two terminals 14 were set on the two places of the outer walls to prepare a heater catalyst A as shown in FIG. 1.

Preparation of sample B

Using the same raw materials and process as used in of sample A, there was prepared a heater catalyst B as shown in FIG. 2, in which only the relative arrangements of the electrodes 13 and the square cells 10 were different from those in the sample A.

The electric resistances of the heater catalysts A and B were each 0.025Ω.

Evaluation

Figure 8:
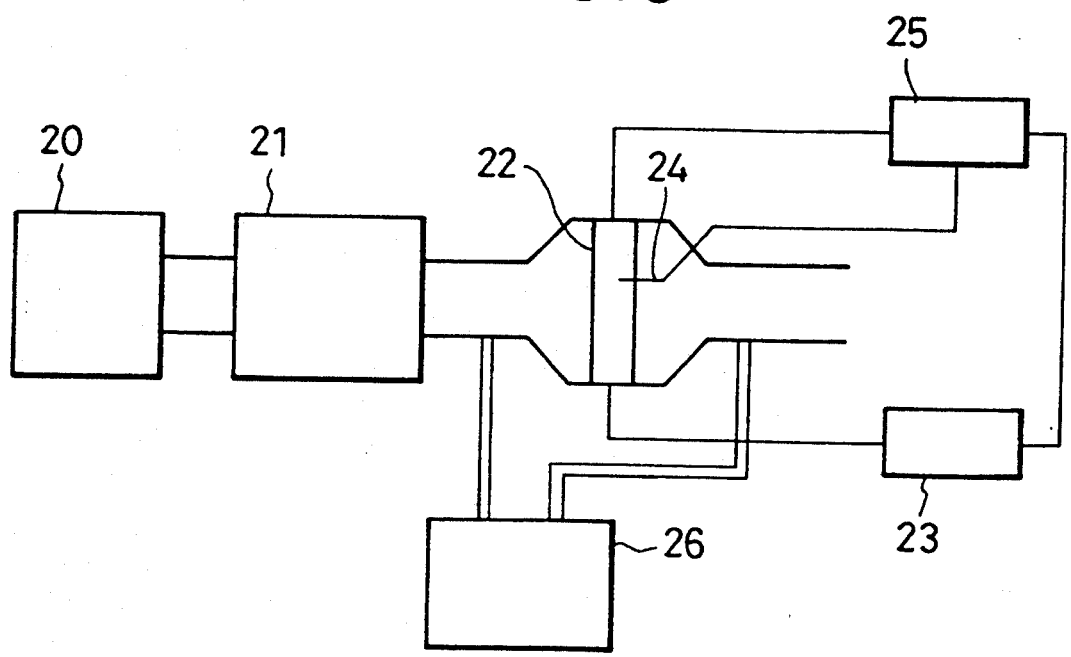
FIG. 8 illustrates the apparatus for evaluation of the performance of heater catalyst, used in the present invention.

The performance evaluation of the heater catalysts A and B was made using an apparatus as shown in FIG. 8.

An exhaust gas from a gasoline engine 20 was cooled to 120° C. by a cooler 21. The cooled gas was introduced into a heater catalyst 22. From the start of evaluation, the heater catalyst 22 was electrified for 60 seconds by a 12-V battery 23 while controlling the temperature of a thermocouple 24 provided in the heater catalyst 22 to be 350° C., by a controller 25. The average conversions (%) of HC, CO and $NO_x$ during the above 60 seconds were measured by an exhaust gas analyzer 26.

In Table 1 are shown the average conversions obtained with the heater catalysts A and B.

TABLE 1

|  | Average conversion (%) | | |
| --- | --- | --- | --- |
|  | HC | CO | $NO_x$ |
| Heater catalyst A | 37 | 55 | 60 |
| Heater catalyst B | 21 | 25 | 33 |

EXAMPLE 2

Using the same raw materials and process as in and for the samples A and B, there were prepared in one-piece, by extrusion, two dried honeycomb bodies 11 of rectangular parallelepiped shape (120×80 mm in outside diameter and 15 mm in thickness) as shown in FIGS. 3 and 4, each having (a) rectangular cells (ratio of short side length and long side length=1:2) of 6 mil in rib thickness and 140 cells/in² in cell density, (b) two electrode plates 13 of 1.5 mm in thickness on the entire surfaces of the upper and lower ends of the honeycomb body 11, and (c) slits 12 (three slits on one side, i.e. six slits in total in the case of FIG. 3, and one slit per each cell in the case of FIG. 4) on the outer wall (6 mil in thickness) of the honeycomb material 11 between the electrodes. The dried honeycomb materials were fired in a H₂ atmosphere under the same conditions as employed for the samples A and B, to obtain two honeycomb structures 11.

The electric resistances of these heaters were each 0.02Ω.

The performance of these heaters were evaluated in the same manner as in Example 1, and the results (average conversions) of Table 2 were obtained.

TABLE 2

|  | Average conversion (%) | | |
| --- | --- | --- | --- |
|  | HC | CO | $NO_x$ |
| Heater of FIG. 3 | 38 | 53 | 58 |
| Heater of FIG. 4 | 40 | 51 | 59 |

EXAMPLE 3

A Fe powder and a Fe-Al powder were compounded so as to give a composition of Fe-20Al (% by weight). Thereto were added an organic binder (methyl cellulose), an antioxidant (oleic acid) and water to prepare a body. The body was extruded. The extrudate was dried to prepare a dried honeycomb body of race truck shape of 150 mm (length of parallel sides)×70 mm (distance between parallel sides)×10 mm (thickness), having square cells 10 of 6 mil in rib thickness and 400 cells/in² in cell density as shown in FIG. 5. Incidentally, the thickness of the outer wall of the dried honeycomb material was 10 mil.

Then, two plates each of 3 mm in thickness, 80 mm in width and 10 mm in length were prepared by extrusion in the same manner as above. Two slits 12 were formed between the parallel sides.

The plates were attached to the upper and lower ends of the dried honeycomb material, and the resulting material was fired in a H₂ atmosphere to obtain a honeycomb structure with two electrodes 13 as a honeycomb monolith heater, as shown in FIG. 5. Incidentally, the contraction during firing was 10% and the electric resistance of the honeycomb monolith heater was 0.02Ω.

Separately, using the same raw materials and process as in and for the samples A and B of Example 1, there were prepared two dried columnar honeycomb materials of 110 mm in outside diameter, 15 mm in thickness and 4 mil in outer wall thickness, having rectangular cells of 3 mil in rib thickness and 900 cells/in² in cell density. The dried columnar honeycomb materials were fired in a H₂ atmosphere. Then, as shown in FIG. 6 and 7, to each of the fired materials were welded two stainless steel plates having the same curvature as the fired material, to form two electrode plates 13. On the outer wall of the honeycomb material between the electrode plates were formed slits 12 (two slits at each side, i.e. four slits in total) to prepare two honeycomb monolith heaters. Incidentally, the ratio of the long side and the short side of each rectangular cell was 2:1 in the case of FIG. 6 and 3:1 in the case of FIG. 7. The electric resistances of the honeycomb monolith heaters were 0.02Ω and 0.015Ω, respectively.

The thus obtained honeycomb monolith heaters of FIGS. 5 to 7 were evaluated for performance in the same manner as in Example 1. Their average conversion were as shown in Table 3.

TABLE 3

|  | Average conversion (%) | | |
| --- | --- | --- | --- |
|  | HC | CO | $NO_x$ |
| Heater of FIG. 5 | 35 | 42 | 40 |
| Heater of FIG. 6 | 33 | 47 | 44 |
| Heater of FIG. 7 | 25 | 30 | 35 |

As described above, the present invention can provide a honeycomb monolith heater which can generate heat uniformly and which has excellent mechanical properties. The honeycomb monolith heater can be produced in simple steps.

What is claimed is:

1. A honeycomb heater, comprising:
   a honeycomb monolith formed of an electrically conductive material, said honeycomb monolith comprising:
   (a) a plurality of parallel fluid flow passages defined by passage walls, said fluid flow passage being rectangular in cross-section; and
   (b) an outer periphery extending parallel to said passages and comprising a plurality of outer peripheral plates which are spaced apart from each other to define an electrically insulating gap between adjacent outer peripheral plates; and
   a pair of electrode plates for flowing an electrical current through the honeycomb monolith, a first electrode plate of said pair of electrode plates being fixed to a first outer peripheral plate and a second electrode plate of said pair of electrode plates being fixed to a second outer peripheral plate, wherein a line passing through the centers of the first and second electrode plates is substantially non-parallel to the passage walls.

2. The honeycomb heater of claim 1, wherein the angle formed by the line passing through the centers of the electrode plates and the passage walls is not less than 45° and not more than 60°.

3. The honeycomb heater of claim 1, wherein a ratio of the thickness of the outer periphery of the honeycomb monolith and the thickness of the passage walls is not greater than 10.

4. The honeycomb heater of claim 1, wherein the outer periphery is thicker than the passage walls.

5. The honeycomb heater of claim 1, wherein the electrically conductive material is metal.

6. The honeycomb heater of claim 1, wherein the shape of the honeycomb monolith as viewed in cross-section taken perpendicular to the fluid flow passages is one of circular, rectangular, and oval which has opposite planar surfaces.

7. The honeycomb heater of claim 1, wherein the fluid flow passages are square in cross-section.

8. The honeycomb heater of claim 1, wherein the honeycomb monolith is formed integrally as one-piece.

9. The honeycomb heater of claim 1, wherein the electrically insulating gap extends parallel to the fluid flow passages.

* * * * *